Aug. 18, 1959    D. J. WANGELIN ET AL    2,900,321

ELECTRIC ARC REACTOR

Filed Dec. 23, 1955

INVENTORS
DON J. WANGELIN
EDGAR C. BOWEN
BY
Edward H. Lang
ATTORNEY

# United States Patent Office 2,900,321
Patented Aug. 18, 1959

2,900,321

ELECTRIC ARC REACTOR

Don J. Wangelin, Barrington, and Edgar C. Bowen, Woodstock, Ill., assignors to The Pure Oil Company, Chicago, Ill., a corporation of Ohio Application December 23, 1955, Serial No. 555,132

3 Claims. (Cl. 204—323)

This invention relates to an improved reactor for use in the electropyrolysis of organic substances initiated by subjecting an organic feed stock to the action of multiple, intermittent, electrical arc discharges.

In the chemical synthesis field, considerable work has been done in the development of new processes for the production of consumer goods. Extensive work has been done in the petroleum industry, where various gas and liquid by-products are made available as feed stocks which may be processed in supplemental refining operations, generally referred to as petrochemical processes. In many processes of this nature, to avoid secondary reactions and the resulting production of undesirable co-products, it is desirable that reaction times be short and provisions be made for the rapid quenching of the reaction effluent. One novel process which effectuates these objectives is the liquid feed, arc discharge process described in U.S. Patent 2,632,731. In this process, there is produced a large amount of thermal energy by means of transient arcs which, in effect, are small reaction zones in which extremely high temperatures are produced almost instantaneously, and just as rapidly reduced by a surrounding cool liquid which is the reaction feed stock. In carrying out this process, there is provided a suitable closed reactor system in which is positioned a fixed electrode assembly, comprising a plurality of stationary electrodes, separated each from the other by insulators. The fixed electrode assembly is retained in a substantially horizontal position within the reactor. Disposed in a shallow layer on the gridwork formed by this electrode assembly is a mass of electrically conductive particles, which function as mobile electrodes. When an alternating current of sufficiently high voltage is impressed across the fixed electrodes, an electrical circuit is completed between these electrodes by means of a number of mobile electrodes in juxtaposition with each other. As a result, transient electric arcs are formed which are quickly disrupted by the gaseous reaction products which are formed. Because these arcs are formed under the surface of the liquid feed stock, the reaction products formed by the high temperatures produced are rapidly quenched and stabilized by the surrounding cooled liquid.

The fixed electrode assemblies, which have been previously employed for these processes, have been generally rectangular in form, consisting of elongated electrically conductive electrodes, such as carbon, separator by insulating spacers manufactured from wood or other suitable non-conducting material, such as porcelain, artificial resins, etc. Each of the electrodes is intermediate to a pair of insulator elements in a manner such that the edges of the electrodes registering with the insulator elements are substantially continuously contiguous therewith. In the electrode assembly a spaced relationship is provided between each of the insulator-electrode combinations by mounting them in a suitable frame. The completed assembly provides a substantially horizontal plane surface upon which the mobile electrodes rest. A sufficient number of these electrodes are placed on the fixed electrode grid to permit the mobile electrodes to come in contact with one another, and form a link electrically connecting two of the fixed electrodes, thereby causing a short, transient arc which breaks the link momentarily. The electrode assembly is suspended in the liquid feed stock to provide free circulation of the liquid through the fixed electrode assembly, thereby permitting the removal of finely-divided carbon, produced as a by-product during the reaction. The presence of these carbon particles, formed during the reaction, has a considerable influence on the fixed electrode systems of the prior art. The particles filter into minute spaces in the insulator-electrode combination between the fixed electrodes and insulating spacers, setting up stresses which, in some instances, are sufficient to crack the fixed electrodes. This problem is very difficult to overcome because unavoidable machining imperfections produce these small spaces between the electrodes and insulators. It has also been found that the insulating material employed becomes impregnated with the finely divided particles of carbon, causing it to become conductive, which results in short circuits between the fixed electrodes. It is therefore the primary object of this invention to provide a fixed electrode assembly, which prevents the fixed electrode insulators from becoming impregnated with finely-divided carbon particles. It is also an object of this invention to eliminate damaging stresses in the electrode assembly. Another object of this invention is to provide a fixed electrode assembly, which will avoid impeding the passage of finely-divided carbonaceous particles between the several spaced, fixed electrodes. These and other objects will become more apparent from the following detailed description of the instant invention.

According to the instant invention, it has been found that the problem of carbon particle infiltration and expeditious removal of the particles from the reaction zone of an electro-pyrolytic conversion system, wherein transient electrical arcs of short duration are produced by means of granular mobile electrodes, can be effected by means of a fixed electrode assembly wherein the adjacent electrodes are separated by means of an insulator, which is designed to avoid impeding the passage of carbon particles produced in the source of the reaction. By assembling the electrodes and the insulated spacer units in spaced relationship, openings are provided between each and every member of the electrode assembly. Accumulations of carbon particle deposits are avoided, and the inimical effects of the prior art electrode assemblies avoided.

Figure 1:
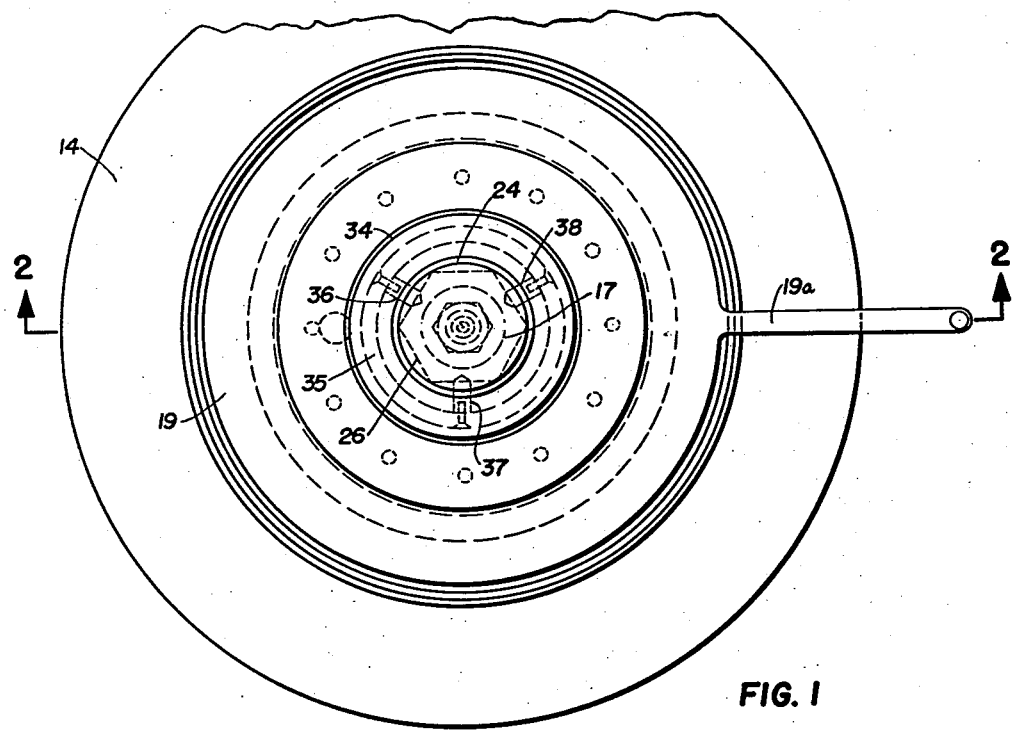
Figure 1 is a plan view of the fixed electrode assembly of this invention, installed in a circular reaction vessel taken along line 1—1.
Figure 2:
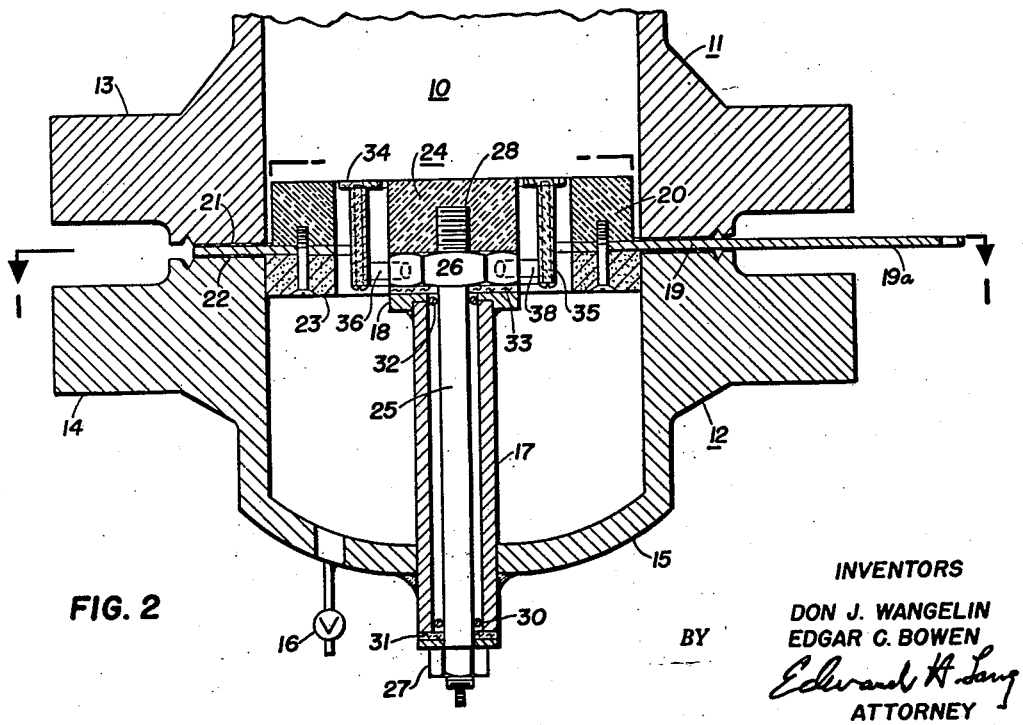
Figure 2 is a cross-sectional view taken along line 2—2 in Figure 1, in which only a fragmentary section of the reactor is shown.

In the reaction system shown in Figures 1 and 2, it is seen that reactor 10, of which a fragmentary view is shown, is constructed of a suitable tubular material of construction, such as stainless steel, to permit the reaction to be carried out under corrosive conditions. The reactor body is in two sections, 11 and 12, which are joined by flanges 13 and 14. The end of the reactor, in which the electrode assembly is mounted, is enclosed by means of flange cap 15. A suitable valve means 16, shown schematically, is provided at the bottom of the reactor for charging a gas or liquid to the reaction system, or for drainage purposes. The fixed electrode assembly of this invention is suspended in the reaction system by means of a tubular support 17, which is longitudinally and co-axially mounted in the reactor extending through an opening suitably provided in flange cap 15. Center electrode support 17 is rigidly held in place by welding or other suitable fastening means. The upper end of electrode support 17 is provided with an outwardly extending flange 18 suitably affixed thereto. Mounted between connecting flange members 13 and 14 of reactor 10 is ground connector 19, electrically connected to carbon electrode 20, which is in the form of a circular ring substantially rectangular in cross-section. Ground connector 19 is electrically insulated from flanges 13 and 14 by insulating gaskets 21 and 22. Ground conductor 19 may also be secured to reactor 12 at the joint between the two sections thereof as an inwardly extending or re-entrant flange, insulated from the reactor, supporting electrode 20. A central opening is provided in ground connector 19 which, in the illustrative embodiment, has a periphery co-incident with the inner diameter of electrode 20. A suitable arm 19a extends laterally from the periphery of the ring, and functions as an electrical conductor. Affixed to the bottom of ground connector 19 is a locater ring 23, which serves to center the electrode assembly, and retain it in a spaced relationship from the inner wall of reactor 10. To effect this arrangement, the outer diameter of the locater ring is slightly less than the inside diameter of the reactor, but is larger than the outer diameter of electrode 20. The inner diameter of locater ring 23 is substantially the same as the central opening in ground connector 19, as well as the inner diameter of electrode 20, in order that a smooth-walled passage, connecting upper section 11 with lower section 12 of reactor 10, will be provided. The locater ring 23 is fastened to ground connector 19 in any suitable manner, such as a drilled and tapped connection, as illustrated. Center electrode 24, in the form of a circular disc having a thickness substantially equal to that of electrode 20, is affixed to the electrode assembly and held in position by means of electrically-conductive rod 25, which is co-axially mounted in electrode assembly suport 17. The rod is held in a fixed position by means of threaded fasteners 26 and 27. The rod is also provided with stud 28, upon which center electrode 24 is mounted. This rod 25, which serves to conduct electrical power to tne center electrode 24, is electrically insulated from contact with electrode support 17, by means of insulators 30, 31, 32, and 33. It will be noted that insulators 30 and 32 are ring shaped, and serve to center the rod 23 within the electrode support 17. The extremity of rod 25, terminating outside reactor 10, is provided with a suitable means for connecting the rod to a power source. With the electrodes concentrically mounted in this manner, there is provided an annular pasageway. Because the electrode assembly also serves as a support for the mobile electrodes, it is necessary that this annular space be partially enclosed. Accordingly, insulator spacer support ring 34 is mounted in spaced relation to each of the electrodes, so as to provide a co-planar area at the upper face of the electrode assembly, upon which the electrically conductive particles, which function as mobile electrodes, can be retained. Insulator spacer ring 34 is maintained in this position by means of support member 35. This support member, in the preferred embodiment, comprises a tubular section, having a wall thickness substantially less than the width of insulator spacer ring 34. The ring is held in an intermediate position in the annular space by suitable means, such as pins 36, 37, and 38, spaced 120° apart, and radially extending from threaded fastener 26, and attached thereto by a suitable means, such as machine screws.

In assembling the various elements of the fixed electrode assembly, electrode 20, ground connector 19, and locater ring 23 are positioned in correct relationship with each other and are held there by suitable means, such as machine screws, which extend upward through the assembly and are screwed in electrode 20. These screws preferably terminate below the top surface of electrode 20 to prevent attack and destruction during operation.

Insulator spacer ring 34 is retained in position on support member 35, by means of machine screws which extend upwardly through support member 35 and into spacer ring 34, but which preferably do not completely penetrate spacer ring 34.

In installing insulator spacer ring 34, it is essential that this member be installed in a spaced relationship between electrode 20 and center electrode 24, so as to provide an annular slot adjacent to the inner diameter of electrode 20, and a second annular slot adjacent to the periphery of center electrode 24. In extent, this gap must be sufficient to permit the support of the mobile electrodes, without interfering with the circulation of the liquid reaction feed stock, or particles of carbon produced during the course of reaction. In this regard, the teaching of Von Ediger in U.S. Patent 2,632,731 can be followed.

To provide for a free circulation of liquid feed stock, as well as the carbon particles, through the electrode assembly, it is necessary that only a short constriction occur in the gap area. Accordingly, another feature of this invention resides in employing an insulator spacer ring, having a cross-sectional configuration such as to avoid undue restriction in the transfer of fluids through this section of the electrode assembly.

In fabricating the insulator spacer ring, it is preferred that the cross-sectional dimensions have a high ratio of width to thickness. However, the spacer should have sufficient mechanical strength to support the mobile electrodes. Because the span between adjacent electrodes for different electrode assembly designs, as well as the mechanical strength for different insulating materials, will vary, it will be necessary to consider each design separately. However, as a general rule, in using an insulator spacer, rectangular in cross-section, electrode spacing and insulating material should be selected so that the spacer does not depend downwardly more than about one-fourth of the electrode vertical thickness into the gap between the electrodes. Although insulator spacers of this design are preferred, in the event that added strength is desired, to the rectangular section may be added a depending section, the sides of which converge inwardly, e.g., triangular or hemispherical in cross-section. In employing this design, the spacer thickness can be coextensive with electrode vertical thickness, because the depending section design offers no resistance to the free circulation of fluids through the electrode assembly. Any spacer design, other than those having a rectangular cross-section, will have the top portion rectangular in cross-section to avoid physically weak knife-edges at the top edges.

In fabricating the various elements of this invention, materials of construction normally employed in the fabrication of such functional parts are employed. For example, the fixed electrodes 20 and 24 are preferably carbon. The locater ring 23 is preferably prepared from a hard, dense, insulating material, such as Transite, which is a dense, homogeneous mixture of cement and asbestos, having unusual electrical insulating and structural characteristics. However, other materials, such as fluoro-resins, polyethylene, wood, or any other electrically insulating material which is chemically inert to the reactants and reaction products, may be used.

In assembling the other insulator elements, such as insulators 30, 31, 32, 33, as well as the insulator spacer ring separating the fixed electrodes, it is preferred to employ a fluoro-resin, such as Teflon or Kel-F, which are fluorinated ethylene polymers; however, other insulating materials of similar characteristics which are resistant to incremental changes in electrical conductivity, such as ceramics, etc., may be employed.

The foregoing description was directed to a fixed electrode assembly in which the fixed electrodes comprised a pair of concentric annuli. Additional spaced annular electrodes of increasing diameter may be added, if desired. While this is a preferred embodiment because of the adaptability of circular electrode assemblies for use in cylindrical, high-pressure reaction vessels, the features of this invention may also be applied to other fixed electrode assemblies, employing substantially parallel rows of elongated, fixed electrodes. The number and dimensions of the electrodes will, of course, depend upon the service in which the electro-pyrolytic conversion process of this invention is to be employed. As in the prior apparatus of this nature, electrode spacing can be related to applied voltage. It has been found that desired results can be obtained where electrode spacing in inches equals 0.004 × applied voltage (volts).

A complete specific embodiment of the electrode assembly of this invention consisted of several components, viz., two carbon electrodes, a stainless steel ground connector, which also served as a support for the outer electrode, an electrode spacer assembly, and a support means for retaining the center electrode in position. To facilitate installation of the electrode assembly in a circular reactor 19½ inches long and having a 5¾-inch inside diameter, constructed from a 6-inch stainless steel pipe, the reactor was made in two parts jointed near the base by a flanged joint. The ends of the reactor were enclosed with 6-inch stainless steel welding caps, the bottom cap being fitted directly to the flange, thereby forming the bottom section of the reactor. Disposed between the companion flanges, and electrically insulated therefrom with Tenax gaskets, was positioned the ground connector, consisting of a stainless steel flat ring ⅛ inch thick, having an outside diameter of 7⅞ inches and an inside diameter of 3⅝ inches. Depending radially from, and integral with, the ground connector was a narrow strip, which served as an electrical conductor for interconnecting the ground connection in the power network. Supraposed on the ground connector was the outer electrode, consisting of a carbon ring rectangular in cross-section. This ring was 1 inch thick, and had an outside diameter of 5⅝ inches and an inside diameter of 3⅝ inches. Infraposed on the ground connector was the locater ring consisting of a Transite ring 9/16 inch thick, and having an outside diameter of 5⅝ inches and an inside diameter of 3⅝ inches. These rings were concentrically and integrally mounted on the connector, such that the inner sides of each element were flush. Coaxially mounted in the bottom section of the reactor, and welded in position, was the center electrode support, consisting of a ¾ inch stainless steel pipe having an inside diameter of about 0.74 inch. The length was selected to permit a coplanar positioning of the center electrode with the outer electrode. The upper end of the support was fitted with a flanged portion 1½ inches in diameter. An electrical conductor, consisting of a ½ inch diameter aluminum rod, was inserted in the support, and held in a fixed, spaced relationship by means of suitable insulators, such as O-shaped neoprene rings, which fit into the annular void between the conductor and the inner wall of the support. The ends of the conductor, which extended beyond the extremities of the electrode support, were threaded, and the fixed relationship maintained by threaded fasteners, which firmly abutted against insulating Teflon washers positioned on the terminal extremities of the electrode support. At the bottom end of the conductor was provided a terminal connection for interconnecting the center electrode to the power network. The upper end of the conductor protruded through the threaded fastener, forming a mounting stud, upon which the center electrode was fitted by means of an internally threaded opening provided in the central axis of the electrode. This electrode was in the form of a 2-inch diameter carbon disc, 1 inch thick. When mounted, the upper surface of this electrode was coplanar with the upper surface of the outer electrode. With the electrodes mounted in this manner, there was provided an annular passage 13/16 inch wide. The greater portion of this passage was bridged with an electrode spacer element, comprising a Teflon ring ⅛ inch thick, and having an inside diameter of 2⅛ inches and an outside diameter of 3 7/16 inches. When this spacer was concentrically mounted in relation to the electrode elements and flush therewith, there was provided a 1/16-inch wide annular slot adjacent to each of the adjoining electrodes. The spacer was held in position by means of an insulator spacer support ring which was a 1⅛-inch section of a Teflon tube, having an outside diameter of 3 1/16 inches and an inside diameter of 2 9/16 inches. The support ring was held suspended concentrically in the annular passage by means of three ⅛ inch stainless steel spokes, extending radially with 120° spacing from the upper threaded fastener, which held the center electrode conductor in place.

This ring was integrally affixed to the spacer to provide a combination of elements T-shaped in cross-section. Although in this embodiment, separate elements were employed for suitably positioning the electrode spacer, this combination can be made in one piece by casting or machining a suitable mass of Teflon.

In general, the procedure for carrying out a reaction involved installing the fixed electrode assembly in the reactor and bolting the reactor sections together. The reactor was flushed with nitrogen introduced through the bottom gate valve. The power was turned on to check for shorts. The liquid charge was added and the power was turned on to check the conductivity of the liquid. The minimum amount of pellets was then added and the power turned on to determine the power input. The amount of pellets was then adjusted to give the desired power input. If the run was to be made under a pressure greater than the pressure due to the material in the reactor, nitrogen was introduced through a gate valve at the top of the reactor, by means of a flexible hose connected to a nitrogen cylinder. If the run was to be made under vacuum, a vacuum pump was connected to the gas outlet line prior to the gas sampling and gas metering points. If gas flow was to be maintained during the run, the gas flow rate was regulated by means of a rotameter, which was calibrated by measuring gas flow with a dry test meter, before the power was applied.

Auxiliary equipment included a dry test meter, an Esterline-Angus recording wattmeter, an isolating transformer, potentiometer, pressure gauge, and timer. The reactor could be cooled by means of a removable drum which could be used as an ice bath, a Dry Ice-kerosine bath, or a water bath.

In operating the reaction system for acetylene production, one gallon of Stoddard solvent and 150 grams of ¼ inch mobile electrodes were charged to the reactor. As the air temperature was about 40° F. no cooling was supplied. The reactor was started and after an initial period of unstable operation, the power input settled down and a steady increase in power input was noted as the temperature of the reactor increased. Table I summarizes in tabular form data obtained during this run.

*Table I*

| | |
|---|---|
| Reactor temperature, °F. | 111 |
| Power input, kw. | 1.00 |
| Reaction effluent gas rate, cu. ft./hr. | 4.55 |
| Gas analyses, mol. percent: | |
|    Carbon monoxide | 1.7 |
|    Hydrogen | 54.3 |
|    Paraffins | 6.4 |
|    Acetylenic compounds | 25.3 |
|    Acidic | 0.4 |
|    Unsaturates | 11.9 |
| | 100.0 |
| Pounds of acetylene per kwh. | 0.085 |
| Kwh. per pound of acetylene | 11.7 |

Although the instant invention is especially suitable for use in converting liquid hydrocarbon feed stocks to gaseous products, such as acetylene, it also finds application in other chemical reactions where very high temperatures followed by very rapid cooling are desired. Because the instant invention is directed to an electrode assembly, featuring the separation of the fixed electrodes by means of a spacer member, which permits free fluid circulation through the electrode assembly, and overcomes the problem of carbon particle infiltration, which occurs in prior art electrode assemblies employed in electropyrolytic conversion processes, wherein transient electric arcs are produced by means of mobile electrodes, a discussion of process details and other collateral matters, such as reactor accessories, has been omitted. If additional details are desired on the operation of the electropyrolytic process in which the instant invention is employed, reference is made to U.S. Patent 2,632,731, issued March 24, 1953, wherein is discussed voltage requirements, mobile electrode dimensions, as well as other operation details.

We claim as our invention:

1. A tubular reactor employed in the electropyrolytic conversion of organic liquids where, in said conversion, reaction temperatures are produced by means of transient electric arcs created between mobile granular electrodes superimposed in a shallow layer on an electrically energized fixed electrode assembly, which comprises an upper section and a removable lower section fitted thereto, forming a joint, the terminal end of each section being capped with a suitable closure, a re-entrant flange laterally depending from the inner wall of said reactor adjacent to said joint, a fixed electrode assembly comprising a first electrode and a second electrode, said first electrode being superposed on said flange and having a perimeteric side coextensive with the inner wall of said reactor and an opposed inner side, forming an internal opening in said first electrode, a second electrode having substantially the same geometric configuration as said opening, mounted within said opening in spaced relation from said first electrode to provide a smooth-walled passage of uniform width between said first and second electrode, the upper surfaces of said electrodes being substantially coplanar, said second electrode being supported in position by an electrode support mounted in the lower section of said reactor, an electrically nonconducting baffle resistant to incremental changes in electrical conductivity disposed in an intermediate position between said electrodes, in a fixed spaced relation with each of said electrodes, and defining slots adjacent to each electrode of a size permitting fluid flow of triturate material therethrough without permitting the passage of granular aggregate, said slots being substantially narrower in width than the width of said baffle, the top surface of said baffle being positioned substantially flush with the adjacent top surfaces of said electrodes, the upper portion of said baffle being rectangular in cross section, having a thickness of not more than about one-fourth the thickness of said adjacent electrodes, and electrical conductor means for interconnecting said electrodes to a power network.

2. A circular cross-sectional tubular reactor employed in the electropyrolytic conversion of organic liquids where, in said conversion, reaction temperatures are produced by means of transient electric arcs created between mobile granular electrodes superimposed in a shallow layer on an electrically energized fixed electrode assembly, which comprises an upper section and a removable lower section fitted thereto by means of a companion flange mounted on each section, the terminal ends of said sections being capped with a suitable closure, an electrically conductive annulus mounted between said flange and laterally extending into said reactor, a first annular electrode superposed on the section of said annulus extending into said reactor, a second circular electrode concentrically mounted in the opening formed by said first electrode, in spaced relation therefrom forming a smooth-walled passageway, the upper surfaces of said electrodes being substantialy coplanar, said second electrode being electrically connected to and being held in position by an electrical conductor mounted, enclosed within, and electrically insulated from a tubular electrode support longitudinally and axially mounted in the bottom section of said reactor, extending upwardly therefrom to a point adjacent to said second electrode, an electrically nonconducting baffle resistant to incremental changes in electrical conductivity disposed in an intermediate position between said electrodes, in a fixed spaced relation with each of said electrodes, and defining slots adjacent to each electrode of a size permitting fluid flow of triturate material therethrough without permitting the passage of granular aggregate, said slots being substantially narrower in width than the width of said baffle, the top surface of said baffle being positioned substantially flush with the adjacent top surfaces of said electrodes, the upper portion of said baffle being rectangular in cross section, having a thickness of not more than about one-fourth the thickness of said adjacent electrodes, and electrical conductor means for interconnecting said electrodes to a power network.

3. An apparatus in accordance with claim 2 in which the edges of said baffle are about 1/32 inch–1/8 inch from the adjacent edges of said electrodes.

References Cited in the file of this patent

UNITED STATES PATENTS

| | | |
|---|---|---|
| 1,115,249 | Schonherr et al. | Oct. 27, 1914 |
| 1,217,421 | Dawe | Feb. 27, 1917 |
| 2,632,731 | Von Ediger | Mar. 24, 1953 |

UNITED STATES PATENT OFFICE

CERTIFICATE OF CORRECTION

Patent No. 2,900,321                                    August 18, 1959

Don J. Wangelin et al.

It is hereby certified that error appears in the printed specification of the above numbered patent requiring correction and that the said Letters Patent should read as corrected below.

Column 1, line 60, for "separator" read -- separated --; column 2, line 48, for "source" read -- course --; column 3, line 39, for "tne" read -- the --.

Signed and sealed this 1st day of March 1960.

(SEAL)
Attest:
KARL H. AXLINE
Attesting Officer

ROBERT C. WATSON
Commissioner of Patents